US010284664B2

(12) United States Patent
Slivkins et al.

(10) Patent No.: US 10,284,664 B2
(45) Date of Patent: May 7, 2019

(54) APPLICATION TESTING (71) Applicant: Microsoft Corporation, Redmond, WA (US)

(72) Inventors: Aleksandrs Slivkins, Arlington, VA (US); Alekh Agarwal, New York, NY (US); John Langford, Scarsdale, NY (US); Sarah L. Bird, Brooklyn, NY (US); Siddhartha Sen, New York, NY (US); Lihong Li, Redmond, WA (US); Miroslav Dudik, Brooklyn, NY (US); Leon Bottou, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 791 days.

(21) Appl. No.: 14/513,012

(22) Filed: Oct. 13, 2014

(65) Prior Publication Data

US 2016/0105351 A1    Apr. 14, 2016

(51) Int. Cl.
*H04L 29/08*    (2006.01)
*G06F 9/44*    (2018.01)

(52) U.S. Cl.
CPC ............. *H04L 67/22* (2013.01); *H04L 67/34* (2013.01); *H04L 67/02* (2013.01)

(58) Field of Classification Search
CPC .. G06F 11/3684; G06F 17/3089; G06F 21/36; G06F 11/3612; G06F 3/0237;

(Continued)

(56) References Cited

U.S. PATENT DOCUMENTS 6,665,653 B1    12/2003 Heckerman et al.
7,275,096 B2 *  9/2007 Green ................. G06F 11/2294
                                                          709/223

(Continued)

FOREIGN PATENT DOCUMENTS

CN    1510570 A    7/2004

OTHER PUBLICATIONS

Richard Vuduc et al.; Improving Distributed Memory Applications Testing by Message Perturbation; ACM; pp. 27-35; <https://dl.acm.org/citation.cfm?id=1147409> (Year: 2006).*

(Continued)

*Primary Examiner* — Geoffrey R St Leger
*Assistant Examiner* — Cuong V Luu
(74) *Attorney, Agent, or Firm* — International IP Law Group, PLLC (57) ABSTRACT

The claimed subject matter includes techniques for providing an application testing service. An example method includes receiving context information from a client system, the context information comprising parameters that describe details of a user interaction with an application under test (AUT). The method also includes receiving a set of potential actions from the client system. The method also includes identifying a selected action from the set of potential actions and sending the selected action to the client system, wherein the AUT is customized based on the selected action. The method also includes receiving reward data from the client system based on a user's interaction with the AUT. The method also includes storing the context information, the selected action, and the reward data to a log of application test data.

30 Claims, 6 Drawing Sheets

(58) Field of Classification Search
CPC .............. G06F 11/3664; G06F 11/3692; G06F 11/3668; G06F 11/34; G06F 11/366; G06F 2201/865; G06F 3/04847; G06F 11/3466; G06F 9/4451; G06F 17/30702
See application file for complete search history.

(56) References Cited

U.S. PATENT DOCUMENTS

| | | | |
|---|---|---|---|
| 7,562,064 | B1 | 7/2009 | Chickering et al. |
| 7,756,769 | B2 | 7/2010 | Haig |
| 8,244,559 | B2 | 8/2012 | Horvitz et al. |
| 8,606,608 | B2 | 12/2013 | Bottou et al. |
| 8,650,084 | B2 | 2/2014 | Athey et al. |
| 8,849,730 | B2 * | 9/2014 | Winn ................ G06F 17/30702 706/12 |
| 8,949,795 | B2 * | 2/2015 | Chandra ............. G06F 11/3684 717/124 |
| 2003/0040850 | A1 | 2/2003 | Najmi et al. |
| 2003/0101255 | A1 * | 5/2003 | Green ................ G06F 11/2294 709/223 |
| 2005/0123027 | A1 | 6/2005 | Cioffi et al. |
| 2006/0129892 | A1 * | 6/2006 | Diaconu ............ G06F 11/3672 714/38.14 |
| 2009/0037881 | A1 * | 2/2009 | Christy .............. G06F 11/3664 717/124 |
| 2009/0265304 | A1 | 10/2009 | Ait-Mokhtar et al. |
| 2009/0300672 | A1 | 12/2009 | Van Gulik |
| 2010/0094673 | A1 | 4/2010 | Lobo et al. |
| 2012/0066665 | A1 * | 3/2012 | Kunze ....................... G06F 8/62 717/124 |
| 2012/0158488 | A1 | 6/2012 | Bottou et al. |
| 2013/0019015 | A1 | 1/2013 | Devarakonda et al. |
| 2013/0111445 | A1 * | 5/2013 | Jones ................. G06F 11/3672 717/124 |
| 2013/0117731 | A1 * | 5/2013 | LeSuer ............... G06F 11/3672 717/125 |
| 2013/0132774 | A1 | 5/2013 | Somendra |
| 2013/0159220 | A1 * | 6/2013 | Winn ................ G06F 17/30702 706/12 |
| 2013/0254384 | A1 | 9/2013 | Wray |
| 2014/0026122 | A1 | 1/2014 | Markande et al. |
| 2014/0059522 | A1 * | 2/2014 | Chandra ............. G06F 11/3684 717/126 |
| 2014/0156383 | A1 * | 6/2014 | Vijayaraghavan .......................... G06Q 30/0244 705/14.43 |
| 2014/0335480 | A1 * | 11/2014 | Asenjo .................... G09B 19/18 434/107 |
| 2015/0324275 | A1 * | 11/2015 | Luan .................. G06F 11/3692 717/124 |
| 2016/0078146 | A1 * | 3/2016 | Simpson ................... G06F 8/38 715/234 |
| 2016/0139914 | A1 * | 5/2016 | Levi ....................... G06Q 10/00 717/121 |
| 2016/0147645 | A1 * | 5/2016 | Kandpal ............. G06F 11/3672 717/124 |
| 2018/0101473 | A1 | 4/2018 | Slivkins et al. |

OTHER PUBLICATIONS

Mark Scott Johnson; Some Requirements for Architectural Support of Software Debugging; ACM; pp. 140-148; <https://dl.acm.org/citation.cfnn?id=801837> (Year: 1982).*

Dolev Dotan et al.; Debugging and Testing Behavioral UML Models; ACM; pp. 838-839; <https://dl.acm.org/citation/cfm?id=1297915> (Year: 2007).*

Simon Holm Jensen et al.; MemInsight Platform-Independent Memory Debugging for JavaScript; ACM; pp. 345-356; <https://dl.acm.org/citation.cfm?id=2786860> (Year: 2015).*

Lingxiao Jiang et al.; Profile-Guided Program Simplification for Effective Testing and Analysis; SIGSOFT; pp. 48-58; <https://dl.acm.org/citation.cfm?id=1453110> (Year: 2008).*

Sebastian Elbaum et al.; An Empirical Study of Profiling Strategies for Released Software and their Impact on Testing Activities; ACM; pp. 65-75; <https://dl.acm.org/citation.cfm?id=1007522> (Year: 2004).*

Laura Beckwith et al.; Effectiveness of End-User Debugging Software Features Are There Gender Issues; CHI; pp. 869-878; <https://dl.acm.org/citation.cfm?id=1055094>; retrieved on Dec. 10, 2018 (Year: 2005).*

Azeem Ahmad et al.; Improving Continuous Integration with Similarity-based Test Case Selection; ACM; pp. 39-45; <https://dl.acm.org/citation.cfm?id=3194744>; retrieved on Dec. 10, 2018 (Year: 2018).*

Author Unknown, "Amazon EC2", Published on: Dec. 7, 2006.

Samimia, et al., "A combinatorial double auction resource allocation model in cloud computing", In Proceedings of Information Sciences, Feb. 13, 2014, 2 pages.

Zhang, et al., "ABACUS: An Auction-Based Approach to Cloud Service Differentiation", In IEEE International Conference on Cloud Engineering, Mar. 25, 2013, pp. 292-301.

Ronan, et al., "Torch: A scientific computing framework for LuaJIT", Retrieved From <<http://torch.ch/>>, Retrieved On: Nov. 20, 2017, 1 Page.

Simard, et al., "Ice: enabling non-experts to build models interactively for large-scale lopsided problems", Retrieved From <<https://arxiv.org/pdf/1409.4814>>, Sep. 16, 2014, 10 Pages.

Slivkins, Aleksandrs, "Contextual bandits with similarity information", In Journal of Machine Learning Research, vol. 15, Issue 1, Jul. 2014, pp. 2533-2568.

Swaminathan, et al., "Off-policy evaluation for slate recommendation", In Journal of Computing Research Repository, May 16, 2016, pp. 1-23.

Szepesvari, Csaba, "Algorithms for Reinforcement Learning", In Publications of Morgan and Claypool Publishers, vol. 4, No. 1, Jun. 2009, pp. 1-98.

Vallo, Mia, "Google Analytics", Retrieved From << http://www.google.com/analytics >>, Retrieved On: Nov. 20, 2017, 12 Pages.

Wang, et al., "Minerva: A scalable and highly efficient training platform for deep learning", In Proceedings of NIPS Workshop, Distributed Machine Learning and Matrix Computations, 2014, pp. 1-9.

Zaharia, et al., "Spark: Cluster computing with working sets", In Proceedings of 2nd USENIX Conference on Hot Topics in Cloud Computing, Jun. 22, 2010, pp. 1-7.

"Microsoft Azure: Cloud Computing Platform & Services", Retrieved From << https://azure.microsoft.com/en-us/ >>, Retrieved On: Nov. 20, 2017, 13 Pages.

"Azure Stream Analytics", Retrieved From << https://azure.microsoft.com/en-us/services/stream-analytics/ >>, Retrieved On: Nov. 20, 2017, 8 Pages.

Hanneke, Steve, "Theory of disagreement-based active learning", In Journal of Foundations and Trends in Machine Learning, vol. 7, No. 2-3, Jun. 12, 2014.

Auer, et al., "The non-stochastic multi-armed bandit problem", In SIAM Journal on Computing, vol. 32, Issue 1, 2002, pp. 48-77.

Hofmann, et al., "Online evaluation for information retrieval", In Journal of Foundations and Trends Information Retrieval, vol. 10, No. 1, Jun. 22, 2016, pp. 1-117.

Langford, et al., "The Epoch-Greedy Algorithm for Contextual Multi-armed Bandits", In Proceedings of 20th International Conference on Neural Information Processing Systems, Dec. 3, 2007, pp. 1-8.

Li, et al., "A contextual-bandit approach to personalized news article recommendation", In Proceedings of 19th international conference on World wide web, Apr. 26, 2010, pp. 661-670.

Li, et al. "Scaling distributed machine learning with the parameter server", In Proceedings of 11th USENIX Conference on Operating Systems Design and Implementation, Oct. 6, 2014, pp. 583-598.

Li, et al., "Unbiased offline evaluation of contextual-bandit-based news article recommendation algorithms", In Proceedings of the fourth ACM international conference on Web search and data mining, Feb. 9, 2011, pp. 297-306.

Lu, et al., "Showing Relevant Ads via Lipschitz Context Multi-Armed Bandits", In 14th International Conference on Artificial Intelligence and Statistics, May 13, 2010, pp. 1-17.

(56) References Cited

OTHER PUBLICATIONS

Ortner, Mathias, "Google Cloud Machine Learning", Retrieved From << https://cloud.google.com/ml-engine/>>, Retrieved On: Nov. 20, 2017, 9 Pages.
Popel, Martin, "Cost Sensitive One Against All (csoaa) multi class example", Retrieved From <<https://github.com/JohnLangford/vowpal_wabbit/wiki/Cost-Sensitive-One-Against-All-(csoaa)-multi-class-example>>, Jul. 19, 2017, 3 Pages.
Agarwal, et al., "Contextual bandit learning under the realizability assumption", In Proceedings of Fifteenth International Conference on Artificial Intelligence and Statistics, Apr. 21, 2012, 9 pages.
"Amazon Machine Learning—Artificial Intelligence on AWS", Retrieved From << https://aws.amazon.com/machine-learning/>>, Retrieved On: Nov. 20, 2017, 9 Pages.
"Azure Machine Learning Studio", Retrieved From <<https://azure.microsoft.com/en-us/services/machine-learning-studio/>>, Retrieved On: Nov. 20, 2017, 8 Pages.
"Blob Storage", Retrieved From <<https://azure.microsoft.com/en-us/services/storage/blobs/>>, Retrieved On: Nov. 20, 2017, 7 Pages.
"Data Factory", Retrieved From <<https://azure.microsoft.com/en-us/services/data-factory/>>, Retrieved On: Nov. 20, 2017, 7 Pages.
"Event Hubs", Retrieved From <<https://azure.microsoft.com/en-us/services/event-hubs/>>, Retrieved On: Nov. 20, 2017, 7 Pages.
"Language Understanding Intelligent Service (LUIS).", Retrieved From << https://www.luis.ai/home>>, Retrieved On: Nov. 20, 2017, 4 Pages.
"Microsoft Power BI", Retrieved From << https://powerbi.microsoft.com/en-us/>>, Retrieved On: Nov. 20, 2017, 12 Pages.
"Mixpanel: Mobile Analytics", Retrieved From << https://mixpanel.com/>>, Retrieved On: Nov. 20, 2017, 5 Pages.
"Multiworld Testing Decision Service", Retrieved From << http://aka.ms/mwt>>, Retrieved On: Nov. 20, 2017, 3 Pages.
"MWT Decision Service Wiki", Retrieved From << https://github.com/Microsoft/mwt-ds/wiki/>>, Sep. 13, 2016, 1 Page.
"Optimizely", Retrieved From << https://www.optimizely.com/, Retrieved On: Nov. 20, 2017, 8 Pages.
"Redis Cluster Specification", Retrieved From <<http://redis.io/topics/cluster-spec>>, Retrieved Date: Nov. 20, 2017, 37 Pages.
"Spark MLlib", Retrieved From <<http://spark.apache.org/mllib >>, Retrieved On: Nov. 20, 2017, 4 Pages.
"Stream Analytics Query Language Reference", Retrieved From << https://msdn.microsoft.com/en-us/ library/azure/dn834998.aspx?f=255&MSPPError=-2147217396>>, Sep. 29, 2015, 2 Pages.
"Table Storage: A NoSQL key-value store for rapid development using massive semi-structured datasets", Retrieved From << https://azure.microsoft.com/en-us/services/storage/tables>>, Retrieved On: Nov. 20, 2017, 5 Pages.
"Web Apps: Create and deploy mission-critical web apps that scale with your business", Retrieved From << https://azure.microsoft.com/en-us/services/app-service/web/>>, Retrieved On: Nov. 20, 2017, 9 Pages.
"Yelp MOE (Metrics Optimization Engine)", Retrieved From << http://yelp.github.io/MOE/ >>, Retrieved On: Nov. 20, 2017, 13 Pages.
Agarwal, et al., "A reliable effective terascale linear learning system", In Journal of Machine Learning, vol. 15 Issue 1, Mar. 2014, pp. 1111-1133.
Agarwal, et al., "Making Contextual Decisions with Low Technical Debt", Retrieved From <<https://arxiv.org/abs/1606.03966>>, pp. 1-14, 2016.
Agarwal, et al., "Personalizing LinkedIn Feed", In Proceedings of 21st ACM SIGKDD International Conference on Knowledge Discovery and Data Mining, Aug. 11, 2015, pp. 1651-1660.
Agarwal, et al., "Taming the monster: A fast and simple algorithm for contextual bandits", In Proceedings of the 31st International Conference on Machine Learning, Oct. 15, 2014, pp. 1-30.
Agarwal, et al., "Thompson Sampling for Contextual Bandits with Linear Payoffs", In Proceedings of the 30th International Conference on Machine Learning, vol. 28, Feb. 13, 2013, 9 Pages.
Auer, Peter, "Using Confidence Bounds for Exploitation-Exploration Trade-offs", In Proceedings of 41st Annual Symposium on Foundations of Computer Science, Nov. 2002, pp. 397-422.
Basoglu, et al., "Computational Network Toolkit", Retrieved From <<http://www.cntk.ai/>>, Jun. 1, 2017, 1 Page.
Beygelzimer, et al., "Agnostic Active Learning Without Constraints", In Proceedings of 23rd International Conference on Neural Information Processing Systems, vol. 1, Dec. 6, 2010, pp. 1-17.
Beygelzimer, et al., "Learning reductions that really work", In Proceedings of the IEEE, vol. 104, Issue 1, Jan. 2016, pp. 136-147.
Bottou, et al., "Counterfactual reasoning and learning systems: The example of computational advertising", In Journal of Machine Learning Research, vol. 14, Issue 1, Nov. 2013, pp. 3207-3260.
Bubeck, et al., "Regret Analysis of Stochastic and Nonstochastic Multi-armed Bandit Problems", In Proceedings of Foundations and Trends in Machine Learning, vol. 5, Issue 1, Dec. 12, 2012, 130 Pages.
Chu, et al., "Contextual Bandits with Linear Payoff Functions", In Proceedings of 14th International Conference on Artificial Intelligence and Statistics, Apr. 11, 2011, pp. 208-214.
Cozowicz, et al.,"MWT Decision Service: GitHub repository", Retrieved From <<https://github.com/Microsoft/mwt-ds>>, Retrieved On: Nov. 20, 2017, 2 Pages.
Cozowicz, Markus, "Vowpal Wabbit (Fast Learning)", Retrieved From <<https://github.com/JohnLangford/vowpal_wabbit/wiki/Download>>, Jan. 19, 2017, 1 Page.
Dean, et al., "TensorFlow—An Open Source Software Library for Machine Learning", Retrieved From << https://www.tensorflow.org/ >>, Retrieved On: Nov. 20, 2017, 5 Pages.
Dudik, et al., "Efficient optimal learning for contextual bandits", In Proceedings of Twenty-Seventh Conference on Uncertainty in Artificial Intelligence, Jul. 14, 2011, 8 Pages.
Dudík, et al., "Doubly robust policy evaluation and learning", In Proceedings of 28th Conference on Machine Learnings, Mar. 23, 2011, 8 Pages.
Dudík, et al., "Sample-efficient nonstationary policy evaluation for contextual bandits", In Proceedings of 28th Conference on Uncertainty in Artificial Intelligence, Oct. 16, 2012, 11 Pages.
Crankshaw, et al, "The missing piece in complex analytics: Low latency, scalable model management and serving with velox", In Proceedings of Seventh Biennial Conference on Innovative Data Systems Research, Jan. 4, 2015, 7 Pages.
Jamieson, et al., "Next: A system for real-world development, evaluation, and application of active learning", In Proceedings of Advances in Neural Information Processing Systems, Dec. 7, 2015, pp. 1-17.
Kohavi, et al., "Controlled ex-periments on the web: survey and practical guide", In Journal of Data Mining and Knowledge Discovery, vol. 18 Issue 1, Feb. 2009, pp. 1-31.
Kohavi, et al., "Online controlled experiments and a/b tests", In Proceedings of Encyclopedia of Machine Learning and Data Mining, Aug. 10, 2015, pp. 1-11.
Krishnamurthy, et al., "Efficient contextual semi-bandit learning", In Journal of Computing Research Repository, Feb. 2015, pp. 1-29.
"Final Office Action Issued in U.S. Appl. No. 12/972,417", dated Jul. 11, 2013, 9 Pages.
"Non Final Office Action Issued in U.S. Appl. No. 12/972,417", dated Jan. 7, 2013, 7 Pages.
"Notice of Allowance Issued in U.S. Appl. No. 12/972,417", dated Aug. 8, 2013, 10 Pages.
"Office Action Issued in Chinese Patent Application No. 201110423107.3", dated Jun. 6, 2014, 7 Pages.
"Office Action Issued in Chinese Patent Application No. 201110423107.3", dated Jan. 29, 2015, 10 Pages.
Devanur, et al., "The Adwords Problem: Online Keyword Matching with Budgeted Bidders under Random Permutations", In Proceedings of the 10th Acm conference on Electronic commerce, Jul. 6, 2009, 8 Pages.
Feldman, et al., "Online Stochastic Packing applied to Display Ad Allocation", Retrieved From: https://arxiv.org/abs/1001.5076, Feb. 17, 2010, 19 Pages.

(56) References Cited

OTHER PUBLICATIONS

Feuerstein, et al., "New Stochastic Algorithms for Placing Ads in Sponsored Search", In the Proceedings of the 5th Latin American Web Congress LA-WEB, May 8, 2007, 9 Pages.

Gang, et al., "Anti-pattern based performance optimization for middleware applications", In Proceedings of the Journal of Software, vol. 19, No. 9, 2008, 1 Page.

Levin, et al., "Dynamic Pricing with Online Learning and Strategic Consumers", In the Proceedings of Forthcoming in Operations Research, Jan. 1, 2007, 43 Pages.

\* cited by examiner

APPLICATION TESTING

BACKGROUND

Software applications are often configured to provide a customized user experience. For example, a website application may receive information related to the context of a user interaction with a webpage, such as time of day, the age of the user, or the geographical locations of the user, among others. Based on this information, the website may provide a different user experience. For example, a news website may provide different new articles to be displayed to the user based on the user's age, the time of the visit, or the user's geographical location. The rule used to associate the contextual information with the selected content may be referred to as a policy. To identify effective policies, the operator of a Website application can test a variety of policies. Traditional application testing tends to be a slow and expensive process.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An embodiment provides a method for testing an application. The method includes receiving context information from a client system. The context information includes parameters that describe details of a user interaction with an application under test (AUT). The method also includes receiving a set of potential actions from the client system and identifying a selected action from the set of potential actions. The method also includes sending the selected action to the client system. The AUT is customized based on the selected action. The method also includes receiving reward data from the client system based on a user's interaction with the AUT and storing the context information, the selected action, and the reward data to a log of application test data.

Another embodiment provides a system for testing an application. The system includes a processor and a system memory that stores code to direct the actions of the processor. The code directs the processor to receive context information from a client system. The context information includes parameters that describe details of a user interaction with an application under test (AUT). The code also directs the processor to receive a set of potential actions from the client system, identify a selected action from the set of potential actions, and send the selected action to the client system. The AUT is customized based on the selected action. The code also directs the processor to receive reward data from the client system based on a user's interaction with the AUT and store the context information, the selected action, and the reward data to a log of application test data.

Another embodiment provides one or more computer-readable memory storage devices for storing computer-readable instructions configured to provide application testing. When executed, the computer-readable instructions instruct one or more processing devices to receive context information from a client system. The context information includes parameters that describe details of a user interaction with an application under test (AUT). The computer-readable instructions also instruct the one or more processing devices to receive a set of potential actions from the client system, identify a selected action from the set of potential actions, and send the selected action to the client system. The AUT is customized based on the selected action. The computer-readable instructions also instruct the one or more processing devices to receive reward data from the client system based on a user's interaction with the AUT and store the context information, the selected action, and the reward data to a log of application test data.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 6:
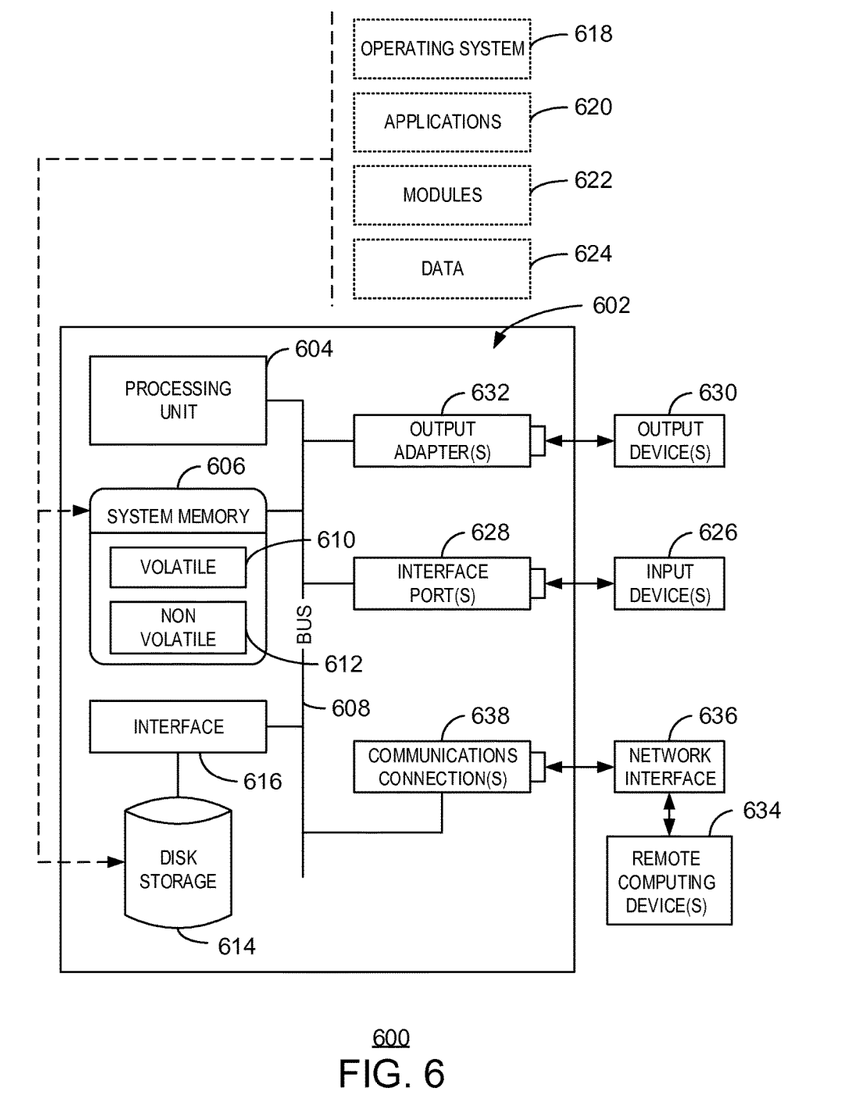
FIG. 6 is a block diagram of an exemplary computing device configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some implementations, various components reflect the use of corresponding components in an actual implementation. In other implementations, any single component illustrated in the figures may be implemented by a number of actual components. The depiction of any two or more separate components in the figures may reflect different functions performed by a single actual component. FIG. 6, discussed below, provides details regarding one computing device that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

The following describes example implementations of techniques for testing an application. To test an application, features of the application can be varied and the users' interactions with the application can be evaluated to determine which variation of a feature provided the better outcome according to a specified metric. The parameters of such tests are usually specified by humans on an ad hoc basis that is specific to a particular application under test. Implementations of the present techniques provide an application testing service that can be used with a wide variety of applications and can be implemented, for example, as a cloud computing service. The application testing system described herein enables the testing of a broad range of applications using a single, generalized system that can be applied to many testing scenarios. The application testing system also provides efficient data collection techniques that can be used by client to evaluate the effectiveness of policies used by their applications. The application testing service provides decision making capabilities regarding variable features of the application under test. The application testing service can also collect data relating to the user interactions with the application under test under each feature variation. The data can be stored as a collection of test data that can be evaluated offline. Evaluation of the test data can reveal which variations of the application provided the better outcome.

Figure 1:
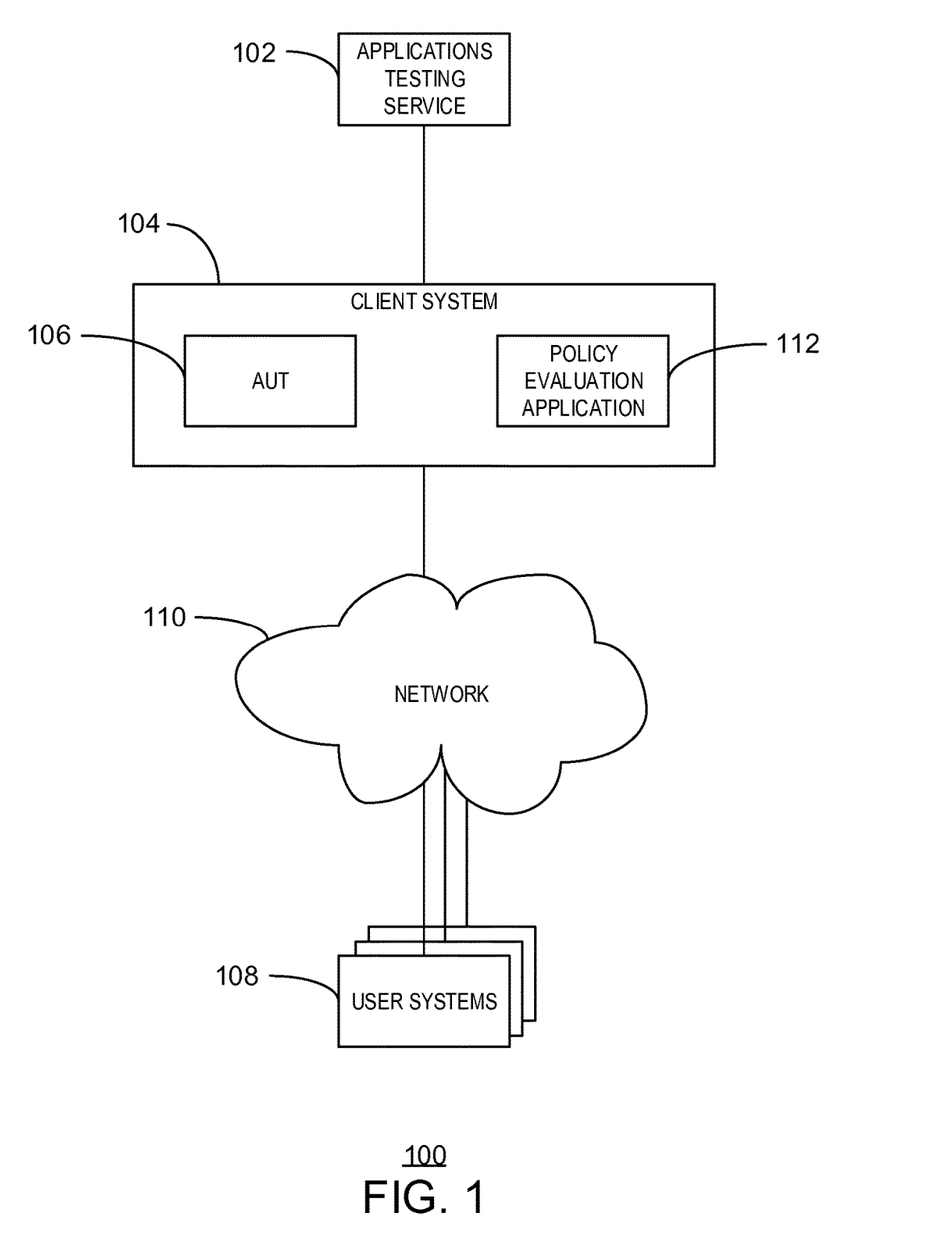
FIG. 1 is a block diagram of an example computer system for testing an application according to implementations described herein.

FIG. 1 is a block diagram of an example computer system for testing an application according to implementations described herein. The example computer system shown in FIG. 1 includes an application testing service 102 and a client system 104. For the sake of clarity, the term "client" is used herein to refer to the entity that owns or has control over the application being tested, and the term "user" is used herein to refer to a user of the application being tested. For example, in some instances, the client may be the owner of a Website and the user may be a visitor to the Website.

The client system 104 can be coupled to the application testing service 102 through any suitable type of network, including a local area network (LAN), a Wide Area Network (WAN), or the Internet, for example. The client system 104 includes an Application Under Test (AUT) 106, which is the application that is being testing using the application testing service 102. The AUT 106 can be substantially any type of application, including a dynamic Web page with configurable layout, a cloud computing service, or a search engine, ad exchange, a Website with customizable content such as a news Website, an operating system interface, a computer game, an online multiplayer gaming environment, a web platform for a crowdsourcing market, or a recommendation system such as system that recommend movies, books or other items, and others. The AUT 106 may also be a component or subsystem of an application such as a user interface.

The AUT 106 can be accessed by a number of user systems 108 through a network 110, which may be any suitable type of network, including a LAN, WAN, or the Internet, for example. The user systems 108 can include any suitable type of electronic device, including personal computers, laptops, smart phones, tablets, and the like.

During normal operation of the AUT 106, the behavior of the AUT 106 can be varied according to one or more policies, which are rules for selecting an action to be performed by the AUT 106 based on context information that describes to some aspect of the user interaction with the AUT 106. Examples of context information include information about the age of the user, the geographical location of the user, the user's gender, the time at which a user interaction is taking place, the type of device that the user is using to access the AUT 106, and any other type of information that may pertain to the user interaction with the AUT 106. Actions that may be identified based on the policy can include things such as the displaying of advertisements, search results, news articles, and products available for purchase, among others. Policies can be specified by the client and may be designed and implemented to provide a better user experience or to improve some aspect of the AUT 106. For example, if the AUT 106 displays a list of news articles, the news articles may be selected according to a policy that selects particular news articles based on the age and/or gender of the user. In this way, the user may be more likely to be presented with choices that are appealing to the user.

The application testing service 102 can be used to determine the effectiveness of various hypothetical policies that could be implemented by the AUT 106. The client system 104 can include one or more application programming interfaces (APIs) that enable the AUT 106 to communicate with the application testing service 102 during testing. During testing, rather than use actual policies, actions can be selected for the purpose of gathering data that can later be analyzed to identify effective policies. The AUT 106 can be tested during normal user interactions. The testing involves data gathering operations that are performed by the application testing service 102 according to specifications provided by the client. Various user interactions with the AUT 106 can trigger data gathering operations. Examples of user interactions include initiating an initial access of the AUT 106, initiating a search, clicking on a link, selecting an option, entering text in a textbox, purchasing a product or service, visiting an advertiser, among others. The gathered data can be used later by the client to evaluate policies that may be employed by the AUT 106.

When a user interacts with the AUT 106, the AUT 106 may obtain context information regarding the interaction. The type of context information to be gathered can be specified by the client. Some types of context information may be received from the user system 108, while other types of context information may be determined by the AUT 106. For example, the user may be prompted by the AUT 106 to provide login information, which may be used by the AUT 106 to obtain previously stored information about the user. Some context information may be received from cookies stored on the user system 108. The AUT 106 may be configured to enable the user to decide whether data can be collected (opt-in or opt-out) about the user or the user's interaction with the AUT 106. The AUT 106 may be configured such that the user is asked to provide consent before data about the user or the user's interaction with the AUT 106 can be collected.

For certain user interactions with the AUT 106, the application testing service 102 can make a decision regarding various possible actions of the AUT 106. In some examples, the client determines the set of actions that are available and the application testing service 102 selects one of the actions from the set and informs the AUT 106 of its decision. After the chosen action has been presented to the user, the user's further interaction with the AUT 106 can be used to determine reward data that can be used to evaluate the effectiveness of the chosen action. For example, if the decision was a decision regarding which product to display, the reward data may include whether the user clicked on the link corresponding with the product, added the product to a shopping cart, completed a purchase of the product, or some combination thereof.

The application testing service 102 can log the data corresponding to the user interactions, including the context information, the chosen action, and the reward data. The logged data can then be evaluated by the client to identify effective policies. To evaluate the logged data, the client system 104 can include a policy evaluation application 112. In some examples, the policy evaluation application 112 can extract information from the log by presenting hypothetical policies to the application testing service 102. The application testing service 102 can then retrieve log information related to the hypothetical policy and return various statistical information based on the data. The statistical data can be used by the client to identify a policy or set of policies that produce desired results. The effectiveness of a policy can determined based on a reward function that may be specified by the client. For example, if the policy relates to determining which news articles to display, the reward function may direct the application testing service 102 to compute the percentage of people who linked to one of the news articles. In this way, the application testing service 102 can be used to evaluate various policies to determine which policies are more effective. The application testing service 102 is configured to be used with substantially any AUT 106 based on specifications provided by the client.

Figure 2:
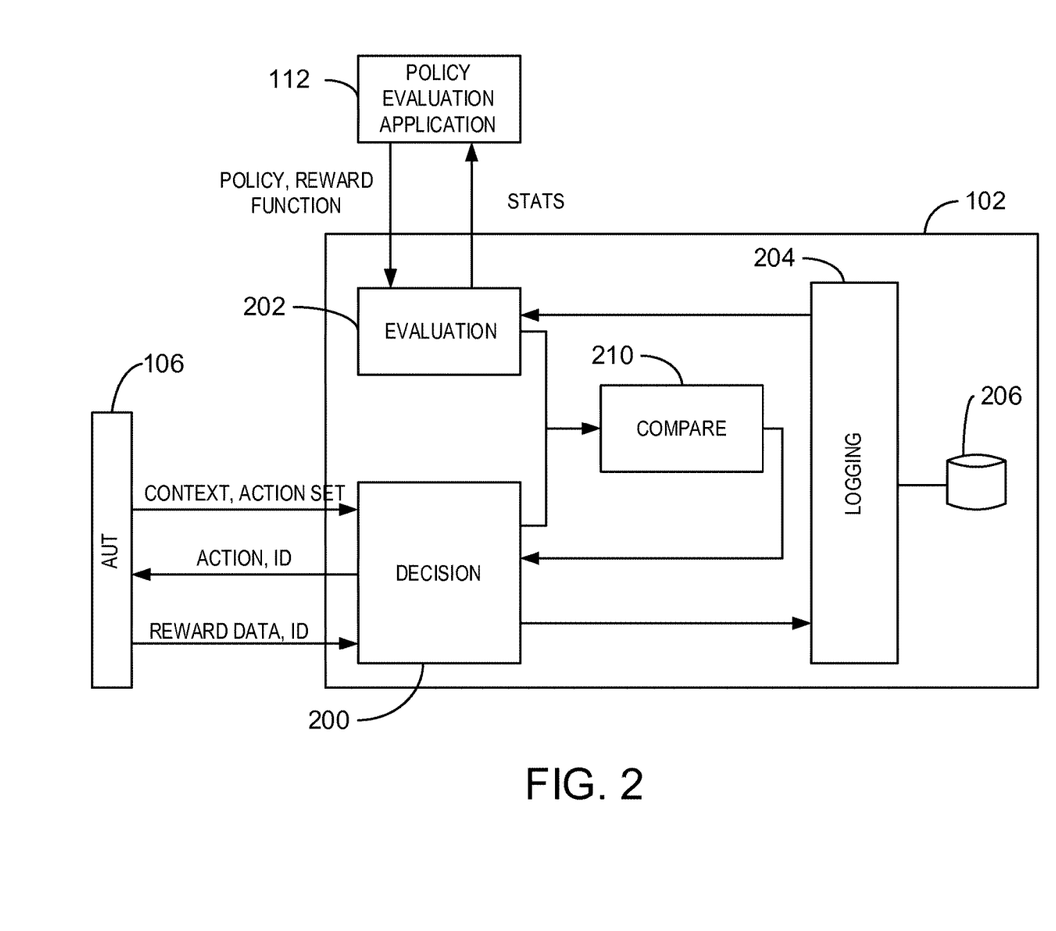
FIG. 2 is a block diagram of an example application testing service according to implementations described herein.

FIG. 2 is a block diagram of an example application testing service 102 according to implementations described herein. Each of the components shown in FIG. 2 can be implemented using a combination of hardware and software. The example architecture shown in FIG. 2 is just one example of an architecture that can be used to implement the techniques described herein.

As shown in FIG. 2, the application testing service 102 can include a decision module 200, an evaluation module 202, and a data logging module 204. The decision module 200 uses an algorithm to determine an action of the AUT 106 based on information provided by the AUT 106. To obtain a data point, the AUT 106 can send a request to the decision module 200 to identify an action to present to a user. In some examples, the AUT 106 can be configured to implement a pre-specified policy for a certain percentage of actions while relying on the decision module 200 for the remainder. Along with the request, the AUT 106 can send context information and an action set that specifies the actions that the decision module 200 can select from. The decision module 200 can use one of several algorithms to select the action, including fixed algorithms and dynamic algorithms, which are explained further below. The selected action is then reported to the AUT 106 and implemented by the AUT 106. Along with the action, the decision module 200 can also send a unique identifier that enables the decision module 200 to associate the action with the corresponding reward information. In some examples, the decision module 200 can send an ordered list of actions to the AUT 106. After implementing the action, the AUT 106 obtains reward data that corresponds to the behavior of the user in response to the action and reports the reward data to the decision module 200 along with the unique identifier. The decision module 200 sends the context information, selected action, and reward data to the data logging module 204, which stores the data to a data storage device 206.

The decision module 200 can implement various decision algorithms for selecting the action to be reported to the AUT 106. The specific algorithm used may be specified by the client through the AUT 106. For example, the decision module 200 may have a set of possible algorithms that can be selected by the AUT 106. The decision algorithms include fixed and adaptive decision algorithms. A fixed decision algorithm is an algorithm wherein decisions are made without regard to reward data received in connection with previous decisions. In some examples, the decision algorithm includes randomly selecting an action from the action set. The decision algorithm can also include eliminating one or more actions from the action set to generate a reduced action set and randomly selecting an action from the reduced action set. For example, actions may be eliminated from the action set if the action is unlikely to provide useful data.

An adaptive decision algorithm is an algorithm wherein actions are selected based on information extracted through analysis of previous decisions and the reward data corresponding to those decisions. For example, if the reward data corresponding to a specific action indicates that the action is unlikely to elicit a useful response from the user, the decision algorithm can eliminate the action from the action set. The decision algorithm can then randomly select one of the remaining actions in the reduced action set. The determination of whether an action is likely to elicit a useful response can also take into account the context information. For example, the action set for the request may request the decision module 200 to select one or more movie choices to present to a user. Based on previous decisions and the corresponding reward data, it may be determined that people of a certain demographic are unlikely to purchase movies of a particular genre. In that case, the decision module 200 may adapt to the new information by eliminating movies of that genre from the actions set when the context information indicates that the user is within the relevant demographic.

To implement adaptive decision algorithms, the decision module 200 can communicate with the evaluation module 202. Upon receiving a decision request from the AUT 106, the decision module 200 can request an evaluation of the action set and the corresponding context information. Based on the action set and the context information, the evaluation module 202 can retrieve relevant data from the logging module 204. The application testing service 102 can analyze previous chosen actions to determine which actions may be likely to produce more useful data by comparing previously chosen actions and the context information associated with the previously chosen actions, as indicated by the compare block 210. The application testing service 102 can provide its findings to the decision module 200. For example, the application testing service 102 may instruct the decision module 200 to eliminate one or more actions from the action set or rank the actions according to their respective likelihood of eliciting a useful response from the user. In some adaptive decision algorithms, the decision module 200 may select one or more low-probability actions and one or more actions that are in accordance with a policy that best fits the received context information. For this and other adaptive algorithms, the decision module 200 can interact with the evaluation module 202 to determine the effectiveness of policies as new test data is collected and logged.

In both the fixed and adaptive decision algorithms, decisions can be randomized to provide an appropriate level of exploration over possible actions. In some examples, the randomization may be weighted in favor of certain actions. For example, if the reward data associated with a particular action indicates a high level of success at eliciting a useful user response, the action may be weighted more heavily by the decision module 200 in future decisions.

During testing of the AUT 106, there is a chance that the experimental decisions provided by the decision module 200 will be much less effective than would otherwise be the case if a known policy were being implemented. Accordingly, testing of the AUT 106 could result in reduced application performance. The performance of the AUT 106 can be described by a one or more statistical values that are computed based on the received reward data. The application testing service 102 can use the performance data to ensure that the performance of AUT 106 is not excessively degraded during the gathering of test data.

To ensure an acceptable level of performance, the AUT 106 can provide an exploration budget and a default policy to the application testing service 102. The exploration budget and default policy can be provided to the application testing service 102 when the AUT 106 initializes with the application testing service 102. The exploration budget may be a threshold value that corresponds with an acceptable level of performance reduction as measured by the reward data and acts as a safeguard against performance degradation due to exploration. The default policy is a policy specified by the client and is known to provide an acceptable level of performance, which may be specified by a default performance parameter.

As the decision module 200 executes, the decision module 200 can compute one or more performance statistics, which are statistics that relate to the cumulative effectiveness of the selected actions as measured by the reward data reported by the AUT 106. The decision module 200 can compare the computed performance statistics to the default performance value, and if the performance difference between the computed performance statistics and the default performance value exceeds the exploration budget, then the application testing service 102 can begin return decisions using the default policy rather than the decision algorithm. The decision module 200 can continue updating the computed performance statistics during execution based on the reward data received for actions selected using the default policy. Once the difference between the computed performance statistics and the default performance value is under the exploration budget, the decision module 200 can the resume selecting actions based on the selection algorithm rather than the default policy.

In some cases, the AUT 106 may not have continuous access to the application testing service 102 during testing. To ensure that testing can take place even when the AUT 106 does not have access to the application testing service 102, the decision module 200 can be configured to support a disconnected mode. In disconnected mode, decisions are made locally on the client system 104 according to a current decision algorithm received from the application testing service 102. The current decision algorithm acts as a fixed decision algorithm during the time that the AUT 106 is disconnected from the application testing service 102. The current decision algorithm may be communicated from the decision module 200 to the AUT 106 during a time when the AUT 106 is connected. After each decision, the AUT 106 can temporarily log context information, decision information, and reward information to a data storage device of the client system 104. When connectivity is restored, the logged data can be communicated to the application testing service 102. If the AUT 106 is using an adaptive decision algorithm, the decision algorithm can be updated and pushed back to the client system 104 each time the AUT 106 reconnects with the application testing service 102.

The policy evaluation application 112 enables the client to evaluate the logged test data. The evaluation of the logged test data enables the client to identify effective policies to be used in the AUT 106. In some examples, the policy evaluation application 112 enables the client to define a hypothetical policy and receive statistical data related to the effectiveness of the hypothetical policy. A hypothetical policy refers to a policy that could be implemented in the AUT 106 and is being submitted to the policy evaluation application 112 to determine the results that would likely be obtained if the policy was actually implemented. To evaluate a hypothetical policy, the policy evaluation application 112 sends the hypothetical policy and a corresponding reward function to the evaluation module 202. The hypothetical policy may be a mapping of context information to specified actions. For example, if the policy is related to the selection of news articles, one mapping may specify that if the user is male, articles related to topic X should be selected, and another mapping may specify that if the user is female, articles of topic Y should be selected. Any suitable combination of context information can be used in the hypothetical policy. The reward function is a function that is used to compute a reward statistic based on the reward data that has been logged during application testing. For example, the reward function may instruct the evaluation module 202 to compute the percentage of instances in which the selected article was linked to by the user.

Upon receiving the hypothetical policy and the reward function, the evaluation module 202 can access all of the logged test data relevant to the hypothetical policy. Information relevant to the hypothetical policy will be any log entry that contains data that matches the parameters of the hypothetical policy. The evaluation module 202 computes the reward statistic against the relevant data according to the reward function, and returns the reward statistic to the policy evaluation application 112. The client can provide a variety of hypothetical policies to determine which policy or set of policies may be more effective based on the returned reward statistic.

In some examples, the policy evaluation application 112 can send a group of hypothetical policies and a corresponding reward function to the evaluation module 202. The evaluation module 202 can evaluate each hypothetical policy in the group of hypothetical policies to determine the relative effectiveness of the hypothetical policies based on the reward statistics computed for each hypothetical policy. In some examples, the evaluation module 202 can return one or more hypothetical policies that have a higher effectiveness, for example, the most effective policy, the top two most effective policies, and so on.

Figure 3:
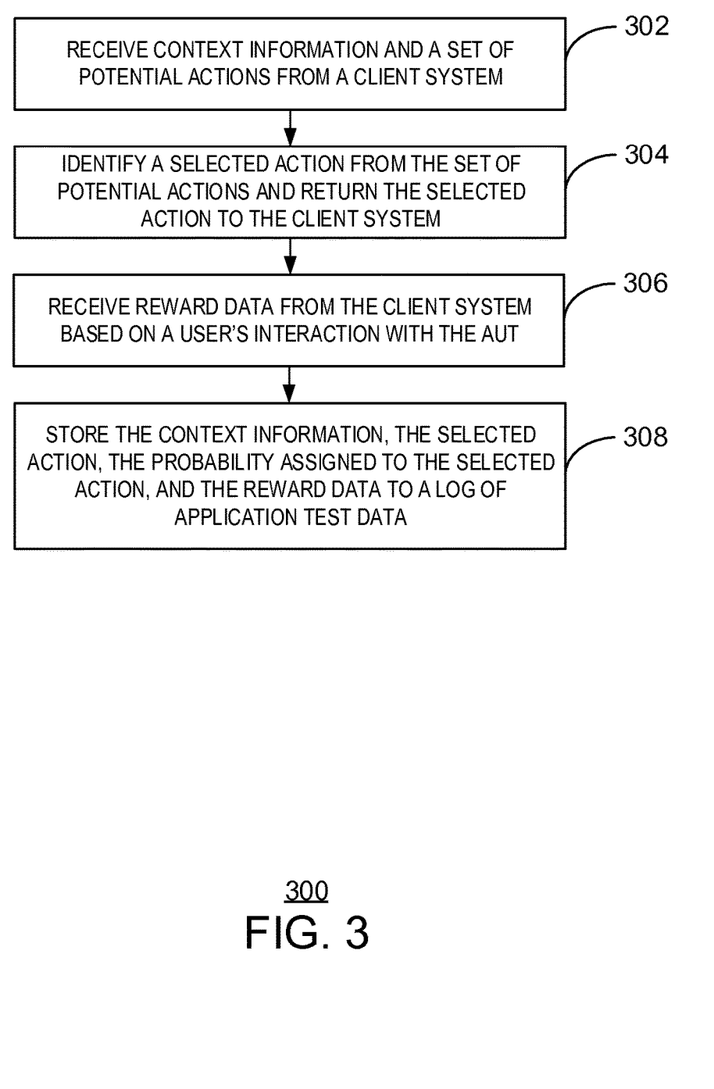
FIG. 3 is a process flow diagram summarizing a method of generating test data for an application according to implementations described herein.

FIG. 3 is a process flow diagram summarizing a method of generating test data for an application according to implementations described herein. One or more components of hardware or software of the computing device 600, may be configured to perform the method 300. In some implementations, various aspects of the method may be performed in a cloud computing device. The method 300 may begin at block 302.

At block 302, the application testing system receives context information and an action set from a client system. In some examples, the application testing system computes a probability distribution, D, for the action set based on previously logged test data. The probability distribution associates each action with a probability that describes the likelihood that the action will be selected by the user. The context information includes parameters that describe details of a user interaction with an AUT. The context information and action set are received as part of a request to select an action and may be received from the AUT executing on the client system. The action set is a set of potential actions that can be selected and presented to a user, such as which products, books, songs, or movie selection, or search results to present to the user, which advertisements or news articles to display, among others.

At block 304, the application testing system selects one or more of the actions from the action set to be presented to the user by the AUT. The application testing system can use fixed decision algorithms or adaptive decision algorithms to choose the selected action, including the example algorithms described herein and others not described. In some examples, the action is selected randomly according to the probability distribution, D. The selected action is sent to the AUT of the client system. The selected action will be used by the AUT to customize some feature of the AUT. For example, the action may instruct the AUT which products, books, songs, or movie selections to present to the user, which advertisements or news articles to display, among others. The application testing system may also provide a list of actions, which may be ranked according to the likelihood of eliciting a useful response from the user, such as list of products, movies, songs, and the like. The action or list of actions may be sent to the client system along with a unique identifier.

At block 306, reward data is received from the client system. The reward data is determined by the AUT based on the user's interaction with the customized AUT. The reward data may be a simple Boolean value that describes the user's reaction to the selected action. For example, the reward data may be an indication of whether the user clicked on a link corresponding to the selected action. In some examples, the reward data includes several values or a function that describes a more detailed set of outcomes. For example, if the action was the display of a product for purchase, the reward data may indicate whether a user clicked on a link to a product in addition to indicating whether the user actually purchased the product.

At block 308, the application testing system stores application testing data to a log. The application testing data can include the storing the context information, the selected action or actions, the probability of the selected action according to the probability distribution computed at block 302, and the reward data received from the client system. The testing data stored to the log can be retrieved through the client system to evaluate hypothetical policies. A method of providing application test data to the client system is described further in relation to FIG. 4. The testing data stored to the log can also be used by the application testing service to select future actions according to an adaptive decision algorithm.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
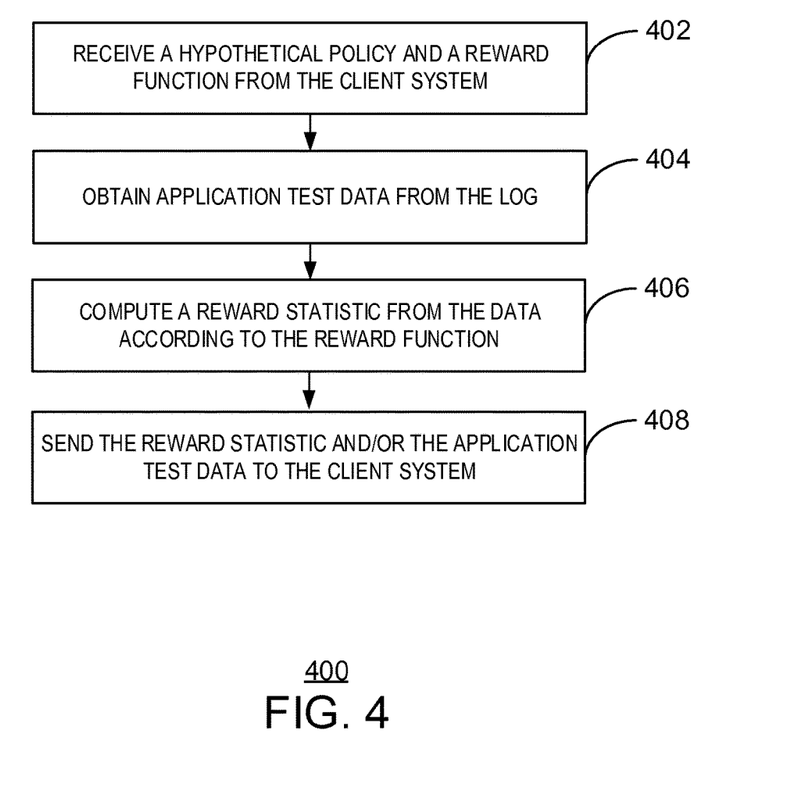
FIG. 4 is a process flow diagram summarizing a method of evaluating test data according to implementations described herein.

FIG. 4 is a process flow diagram summarizing a method of evaluating test data according to implementations described herein. One or more components of hardware or software of the computing device 600, may be configured to perform the method 400. In some implementations, various aspects of the method 400 may be performed in a cloud computing device. The method 400 may be performed by the application testing system and may begin at block 402.

At block 402, the application testing system receives a hypothetical policy and a reward function from the client system. The hypothetical policy can be a mapping of context information to specified actions that could be implemented by the AUT that the client is testing.

At block 404, the application testing service obtains relevant data from a log of application test data. The data obtained from the log can include all of those log entries whose context information matches a context value of the hypothetical policy.

At block 406, a reward statistic is computed using the data obtained from the application testing log. The reward statistic is computed according to the reward function received from the client. In some examples, block 406 may include computing two or more reward statistics. In some examples, no reward statistic is computed and block 406 is skipped.

At block 408, test results are returned to the client system. Sending test results may include sending the reward statistics computed at block 406, sending the application test data obtained from the application test log, or some combination thereof.

Figure 5:
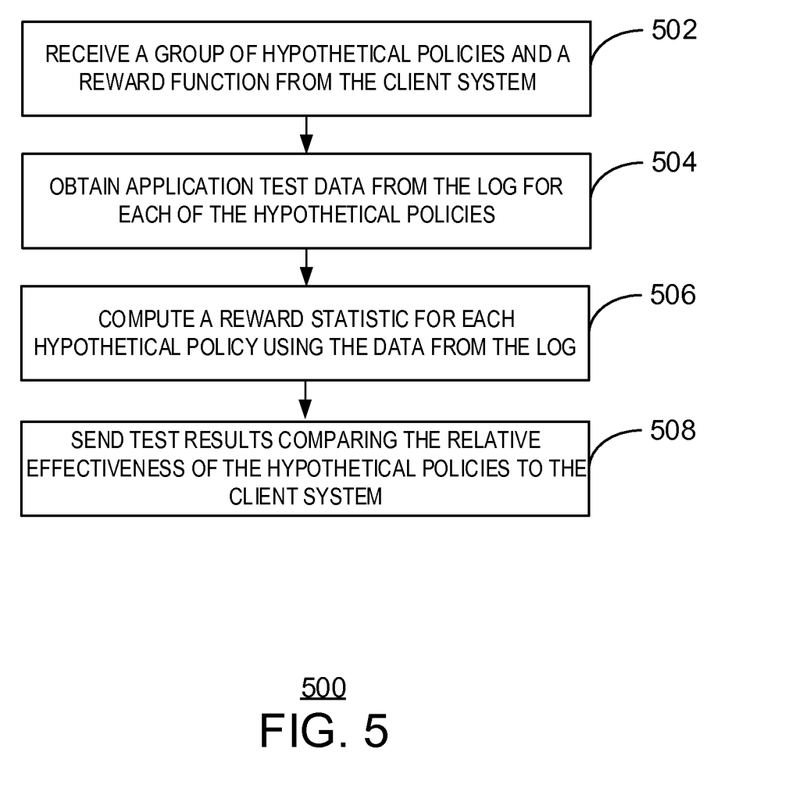
FIG. 5 is a process flow diagram summarizing another method of evaluating test data according to implementations described herein.

FIG. 5 is a process flow diagram summarizing another method of evaluating test data according to implementations described herein. One or more components of hardware or software of the computing device 600, may be configured to perform the method 500. In some implementations, various aspects of the method 500 may be performed in a cloud computing device. The method 500 may be performed by the application testing system and may begin at block 502.

At block 502, the application testing system receives a group of hypothetical policies from the client system. Each hypothetical policy can be a mapping of context information to specified actions that could be implemented by the AUT that the client is testing. The hypothetical policies may be created by the client and may be submitted to the application testing system to determine which policy or subset of policies will be more effective according to the test data that has been collected by the application testing system.

At block 504, the application testing service obtains relevant data from a log of application test data for each of the hypothetical policies. For each hypothetical policy, the data obtained from the log can include all of those log entries whose context information matches a context value of the hypothetical policy.

At block 506, a reward statistic is computed for each hypothetical policy using the data obtained from the application testing log. The reward statistic is computed according to the reward function received from the client. In some examples, block 406 may include computing two or more reward statistics. In some examples, no reward statistic is computed and block 406 is skipped.

At block 508, test results comparing the relative effectiveness of the hypothetical policies are returned to the client system. For example, the application testing service can identify one or more of the most effective policies of the hypothetical policies, rank the policies according to effectiveness, identify all of the hypothetical policies whose effectiveness exceeds a specified threshold, and the like. Sending test results may also include sending the reward statistics computed at block 506, sending the application test data obtained from the application test log, or some combination thereof.

FIG. 6 is intended to provide a brief, general description of a computing architecture in which the various techniques described herein may be implemented. For example, a method and system for testing an application can be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 6 is a block diagram of an exemplary computing device configured for implementing various aspects of the techniques described herein. The computing device 600 is an example of a computing device that can be used to implement any of the techniques described above. For example, the exemplary computing device 600 may be one computing device in a group of commuting devices configured as a cloud computing platform. The exemplary computing device 600 includes a computer 602. The computer 602 includes a processing unit 604, a system memory 606, and a system bus 608.

The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure, including the memory bus or memory controller, a peripheral bus or external bus, and a local bus using any variety of available bus architectures known to those of ordinary skill in the art. The system memory 606 includes computer-readable storage media that includes volatile memory 610 and nonvolatile memory 612.

The basic input/output system (BIOS), containing the basic routines to transfer information between elements within the computer 602, such as during start-up, is stored in nonvolatile memory 612. By way of illustration, and not limitation, nonvolatile memory 612 can include read only memory (ROM), programmable ROM (PROM), electrically programmable ROM (EPROM), electrically erasable programmable ROM (EEPROM), or flash memory.

Volatile memory 610 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other computer-readable media, such as removable/non-removable, volatile/non-volatile computer storage media. FIG. 6 shows, for example a disk storage 614. Disk storage 614 includes, but is not limited to, devices like a magnetic disk drive, floppy disk drive, tape drive, Jaz drive, Zip drive, LS-210 drive, flash memory card, or memory stick.

In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used such as interface 616.

It is to be appreciated that FIG. 6 describes software that acts as an intermediary between users and the basic computer resources described in the suitable computing device 600. Such software includes an operating system 618. Operating system 618, which can be stored on disk storage 614, acts to control and allocate resources of the computer system 602.

System applications 620 take advantage of the management of resources by operating system 618 through program modules 622 and program data 624 stored either in system memory 606 or on disk storage 614. It is to be appreciated that the claimed subject matter can be implemented with various operating systems or combinations of operating systems.

A user enters commands or information into the computer 602 through input devices 626. Input devices 626 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 626 connect to the processing unit 604 through the system bus 608 via interface ports 628. Interface ports 628 include, for example, a serial port, a parallel port, a game port, and a universal serial bus (USB).

Output devices 630 use some of the same type of ports as input devices 626. Thus, for example, a USB port may be used to provide input to the computer 602, and to output information from computer 602 to an output device 630.

Output adapter 632 is provided to illustrate that there are some output devices 630 like monitors, speakers, and printers, among other output devices 630, which are accessible via adapters. The output adapters 632 include, by way of illustration and not limitation, video and sound cards that provide a means of connection between the output device 630 and the system bus 608. It can be noted that other devices and systems of devices provide both input and output capabilities such as remote computers 634.

The computer 602 can be a server hosting various software applications in a networked environment using logical connections to one or more remote computers, such as remote computers 634. The remote computers 634 may be client systems configured with web browsers, PC applications, mobile phone applications, and the like.

The remote computers 634 can be a personal computer, a server, a router, a network PC, a workstation, a microprocessor based appliance, a mobile phone, a peer device or other common network node and the like, and typically includes many or all of the elements described relative to the computer 602.

For purposes of brevity, a memory storage device 636 is illustrated with remote computers 634. Remote computers 634 is logically connected to the computer 602 through a network interface 638 and then connected via a wireless communication connection 640.

Network interface 638 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connections 640 refers to the hardware/software employed to connect the network interface 638 to the bus 608. While communication connection 640 is shown for illustrative clarity inside computer 602, it can also be external to the computer 602. The hardware/software for connection to the network interface 638 may include, for exemplary purposes, internal and external technologies such as, mobile phone switches, modems including regular telephone grade modems, cable modems and DSL modems, ISDN adapters, and Ethernet cards.

An exemplary processing unit 604 for the server may be a computing cluster. The disk storage 614 may comprise an enterprise data storage system, for example, holding thousands of impressions.

EXAMPLE 1

An example of a method is provided. The example method includes receiving context information from a client system. The context information includes parameters that describe details of a user interaction with an application under test (AUT). The example method also includes receiving a set of potential actions from the client system and identifying a selected action from the set of potential actions. The example method also includes sending the selected action to the client system. The AUT is customized based on the selected action. The example method also includes receiving reward data from the client system based on a user's interaction with the AUT. The example method also includes storing the context information, the selected action, and the reward data to a log of application test data.

In some implementations, the method can also include receiving a hypothetical policy from the client system and obtaining data from the log of application test data, wherein the data includes log entries that include context information that matches a context parameter of the hypothetical policy. The obtained data can then be sent to the client system. In some implementations, the method includes receiving a hypothetical policy and a reward function from the client system, obtaining data from the log of application test data, and computing a reward statistic from the data according to the reward function. The reward statistic can then be sent to the client system.

Identifying the selected action can include executing a fixed algorithm that does not adapt to previously acquired reward data. Identifying the selected action can also include choosing the selected action randomly from the set of potential actions or eliminating actions from the set of potential actions to generate a reduced action set and choosing the selected action randomly from the reduced action set. Identifying the selected action can also include choosing the selected action based, at least in part, on previously received reward data. The example method can also include receiving an identification of a selected decision algorithm from the client system, and using the selected algorithm for identifying the selected action.

EXAMPLE 2

An example of a system is provided. The example system includes a processor and a system memory that stores code to direct the actions of the processor. The code directs the processor to receive context information from a client system. The context information includes parameters that describe details of a user interaction with an application under test (AUT). The code also directs the processor to receive a set of potential actions from the client system. The code also directs the processor to identify a selected action from the set of potential actions and send the selected action to the client system. The AUT is customized based on the selected action. The code also directs the processor to receive reward data from the client system based on a user's interaction with the AUT and store the context information, the selected action, and the reward data to a log of application test data.

In some implementations, the system memory includes code that can direct the processor to receive a hypothetical policy from the client system and obtain data from the log of application test data. The data includes log entries that include context information that matches a context parameter of the hypothetical policy. The system memory also includes code to direct the processor to send the data to the client system. In some implementations, the system memory includes code that can direct the processor to receive a hypothetical policy and a reward function from the client system, obtain data from the log of application test data, and compute a reward statistic from the data according to the reward function. The reward statistic can then be sent the reward statistic to the client system.

The code to identify the selected action can direct the processor to execute a fixed algorithm that does not adapt to previously acquired reward data. The code to identify the selected action can also direct the processor to choose the selected action randomly from the set of potential actions, or eliminate actions from the set of potential actions based on previously received reward data to generate a reduced action set and choose the selected action randomly from the reduced action set. The system memory can also include code to receive an identification of a selected decision algorithm from the client system, and use the selected decision algorithm to identify the selected action.

EXAMPLE 3

An example of a computer-readable memory storage device for storing computer-readable instructions is provided. When executed, the computer-readable instructions instruct one or more processing devices to receive context information from a client system. The context information includes parameters that describe details of a user interaction with an application under test (AUT). The computer-readable instructions also instruct the one or more processing devices to receive a set of potential actions from the client system, identify a selected action from the set of potential actions, and send the selected action to the client system. The AUT is customized based on the selected action. The computer-readable instructions also instruct the one or more processing devices to receive reward data from the client system based on a user's interaction with the AUT and store the context information, the selected action, and the reward data to a log of application test data.

In some implementations, the computer-readable instructions that instruct the one or more processing devices to identify a selected action randomly choose an action from the set of potential actions. In some implementations, the computer-readable memory storage device of claim 16 includes computer-readable instructions that instruct the one or more processing devices to receive an identification of a decision algorithm from the client system, wherein the identified decision algorithm is used to identify the selected action. In some implementations, the computer-readable memory storage device includes computer-readable instructions that instruct the one or more processing devices to compare previously stored context information, selected actions, and reward data to identify the selected action based on which action is more likely to elicit a useful response from the user.

The computer-readable memory storage device can include computer-readable instructions that instruct the one or more processing devices to receive a hypothetical policy and a reward function from a client system and obtain data from the log of application test data. The data includes log entries that include context information that matches a context parameter of the hypothetical policy. The instructions can also instruct the one or more processing devices to compute a reward statistic from the data according to the reward function and send the reward statistic to the client system.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method, comprising:
receiving context information from a client system at an application testing service located remotely from the client system, wherein the client system is running an application under test (AUT) that is accessible to a user from a user system, the context information comprising parameters that describe details of an interaction with the AUT by the user accessing the AUT from the user system;
receiving a set of potential actions from the client system at the application testing service;
identifying a selected action from the set of potential actions and sending the selected action from the application testing service to the client system, wherein the AUT is customized to present the selected action to the user;
receiving reward data from the client system at the application testing service wherein the reward data is generated by the client system and describes one or more details about the user's interaction with the customized AUT, wherein the reward data is used to evaluate an effectiveness of the selected action based on the user's interaction with the customized AUT; and storing the context information, the selected action, a probability of the selected action describing a likelihood that the selected action will be selected by the user, and the reward data to a log of application test data.

2. The method of claim 1, comprising:
receiving a hypothetical policy from the client system;
obtaining data from the log of application test data, the data comprising log entries that include context information that matches a context parameter of the hypothetical policy; and
sending the data to the client system.

3. The method of claim 1, comprising:
receiving a hypothetical policy and a reward function from the client system, wherein the reward function is a mathematical formula for computing a reward statistic that describes an effectiveness of the hypothetical policy;
obtaining data from the log of application test data, the data comprising log entries that include context information that matches a context parameter of the hypothetical policy;
computing the reward statistic from the data according to the reward function; and
sending the reward statistic to the client system.

4. The method of claim 1, wherein identifying the selected action comprises executing a fixed algorithm that does not adapt to previously acquired reward data.

5. The method of claim 1, wherein identifying the selected action comprises choosing the selected action randomly from the set of potential actions.

6. The method of claim 1, wherein identifying the selected action comprises eliminating actions from the set of potential actions to generate a reduced action set and choosing the selected action randomly from the reduced action set.

7. The method of claim 1, wherein identifying the selected action comprises choosing the selected action based, at least in part, on previously received reward data.

8. The method of claim 1, comprising receiving an identification of a selected decision algorithm from the client system, and using the selected decision algorithm for identifying the selected action.

9. The method of claim 1, comprising:
receiving two or more hypothetical policies and a reward function from the client system, wherein the reward function is a mathematical formula for computing a reward statistic that describes an effectiveness of each hypothetical policy;
obtaining reward data relevant to the two or more hypothetical policies from the log of application test data;
computing the reward statistic for each of the two or more hypothetical policies from the reward data according to the reward function; and
identifying a effectiveness of each of the hypothetical policies.

10. The method of claim 1, comprising:
receiving a default policy, a threshold performance level, and an exploratory budget from the AUT; and
if the performance of the AUT falls below the threshold performance level or exhausts the exploratory budget, using the default policy to identify the selected action.

11. The method of claim 1, wherein the selected action identifies content to be presented to the user and the reward data describes whether the user clicked on a link associated with the content.

12. The method of claim 1, wherein the selected action identifies a news article to be presented to the user and the reward data describes whether the user clicked on a link associated with the news article.

13. The method of claim 1, wherein the selected action identifies an advertisement to be presented to the user and the reward data describes whether the user clicked on a link associated with the advertisement.

14. The method of claim 1, wherein the selected action identifies a product to be presented to the user, and the reward data indicates whether the user purchased the product.

15. A system for testing an application, comprising:
a processor; and
a system memory comprising code to direct the processor to:
receive context information from a client system, wherein the client system is running an application under test (AUT) that is accessible to a user from a user system, the context information comprising parameters that describe details of an interaction with the AUT by the user accessing the AUT from the user system;
receive a set of potential actions from the client system;
identify a selected action from the set of potential actions and send the selected action to the client system, wherein the AUT is customized to present the selected action to the user;
receive reward data from the client system wherein the reward data is generated by the client system and describes one or more details about the user's interaction with the customized AUT, wherein the reward data is used to evaluate an effectiveness of the selected action based on the user's interaction with the customized AUT; and
store the context information, the selected action, a probability of the selected action describing a likelihood that the selected action will be selected by the user, and the reward data to a log of application test data.

16. The system of claim 15, the system memory comprising code to direct the processor to:
receive a hypothetical policy from the client system;
obtain data from the log of application test data, the data comprising log entries that include context information that matches a context parameter of the hypothetical policy; and
send the data to the client system.

17. The system of claim 15, the system memory comprising code to direct the processor to:
receive a hypothetical policy and a reward function from the client system, wherein the reward function is a mathematical formula for computing a reward statistic that describes an effectiveness the hypothetical policy;
obtain reward data from the log of application test data, the reward data comprising log entries that include context information that matches a context parameter of the hypothetical policy;
compute the reward statistic from the reward data according to the reward function; and
send the reward statistic to the client system.

18. The system of claim 15, wherein the code to identify the selected action directs the processor to execute a fixed algorithm that does not adapt to previously acquired reward data.

19. The system of claim 15, wherein the code to identify the selected action directs the processor to choose the selected action randomly from the set of potential actions.

20. The system of claim 15, wherein the code to identify the selected action directs the processor to:
- eliminate actions from the set of potential actions based, at least in part, on previously received reward data to generate a reduced action set; and
- and choose the selected action randomly from the reduced action set.

21. The system of claim 15, the system memory comprising code to receive an identification of a selected decision algorithm from the client system, and use the selected decision algorithm to identify the selected action.

22. The system of claim 15, the system memory comprising code to:
- receive two or more hypothetical policies and a reward function from the client system, wherein the reward function is a mathematical formula for computing a reward statistic that describes an effectiveness of a policy;
- obtain reward data relevant to the two or more hypothetical policies from the log of application test data;
- compute the reward statistic for each of the two or more hypothetical policies from the reward data according to the reward function; and
- identify the effectiveness of each of the hypothetical policies.

23. The system of claim 15, the system memory comprising code to:
- receive a default policy, a threshold performance level, and an exploratory budget from the AUT; and
- if the performance of the AUT falls below the threshold performance level or exhausts the exploratory budget, use the default policy to identify the selected action.

24. One or more computer-readable memory storage devices for storing computer-readable instructions that, when executed, instruct one or more processing devices to:
- receive context information from a client system, wherein the client system is running an application under test (AUT) that is accessible to a user from a user system, the context information comprising parameters that describe details of an interaction with the AUT by the user accessing the AUT from the user system;
- receive a set of potential actions from the client system;
- identify a selected action from the set of potential actions and send the selected action to the client system, wherein the AUT is customized to present the selected action to the user;
- receive reward data from the client system wherein the reward data is generated by the client system and describes one or more details about the user's interaction with the customized AUT, wherein the reward data is used to evaluate an effectiveness of the selected action based on the user's interaction with the customized AUT; and
- store the context information, the selected action, a probability of the selected action describing a likelihood that the selected action will be selected by the user, and the reward data to a log of application test data.

25. The one or more computer-readable memory storage devices of claim 24, wherein the computer-readable instructions that instruct the one or more processing devices to identify a selected action, randomly choose an action from the set of potential actions.

26. The one or more computer-readable memory storage devices of claim 24, comprising computer-readable instructions that instruct the one or more processing devices to receive an identification of a decision algorithm from the client system, wherein the identified decision algorithm is used to identify the selected action.

27. The one or more computer-readable memory storage devices of claim 24, comprising computer-readable instructions that instruct the one or more processing devices to compare previously stored context information, selected actions, and reward data to identify the selected action based on which action is more likely to elicit a useful response from the user.

28. The one or more computer-readable memory storage devices of claim 24, comprising computer-readable instructions that instruct the one or more processing devices to:
- receive a hypothetical policy and a reward function from a client system, wherein the reward function is a mathematical formula for computing a reward statistic that describes an effectiveness of the hypothetical policy;
- obtain reward data from the log of application test data, the data comprising log entries that include context information that matches a context parameter of the hypothetical policy;
- compute the reward statistic from the reward data according to the reward function; and
- send the reward statistic to the client system.

29. The one or more computer-readable memory storage devices of claim 24, comprising computer-readable instructions that instruct the one or more processing devices to:
- receive two or more hypothetical policies and a reward function from the client system, wherein the reward function is a mathematical formula for computing a reward statistic that describes an effectiveness of each of the hypothetical policies;
- obtain reward data relevant to the two or more hypothetical policies from the log of application test data;
- compute the reward statistic for each of the two or more hypothetical policies from the reward data according to the reward function; and
- identify the effectiveness of each of the hypothetical policies.

30. The one or more computer-readable memory storage devices of claim 24, comprising computer-readable instructions that instruct the one or more processing devices to:
- receive a default policy, a threshold performance level, and an exploratory budget from the AUT; and
- if the performance of the AUT falls below the threshold performance level or exhausts the exploratory budget, use the default policy to identify the selected action.

* * * * *